(12) United States Patent
Lane (10) Patent No.: US 7,841,815 B1
(45) Date of Patent: Nov. 30, 2010

(54) CARGO RESTRAINT SYSTEM

(76) Inventor: David A. M. Lane, 1700 E. Main St., Ashland, OR (US) 97520

( * ) Notice: Subject to any disclaimer, the term of this patent is extended or adjusted under 35 U.S.C. 154(b) by 808 days.

(21) Appl. No.: 11/417,985

(22) Filed: May 3, 2006

Related U.S. Application Data

(63) Continuation-in-part of application No. 10/830,692, filed on Apr. 21, 2004, now abandoned, which is a continuation-in-part of application No. 10/392,451, filed on Mar. 20, 2003, now abandoned.

(51) Int. Cl.
*B60P 7/08* (2006.01)

(52) U.S. Cl. .................. 410/100; 410/97; 410/103; 410/106; 410/107; 410/116

(58) Field of Classification Search ............. 410/12, 410/97, 100, 103, 106, 116, 107, 111, 117, 410/118; 24/265 CD, 115 K; 248/499
See application file for complete search history.

(56) References Cited

U.S. PATENT DOCUMENTS 5,338,136 A * 8/1994 Hetchler .................. 410/100

6,171,037 B1 * 1/2001 Andre .................... 410/20

* cited by examiner

*Primary Examiner*—Stephen Gordon (57) ABSTRACT

In accordance with the present invention, a vehicle cargo restraint system comprises a cargo restraining strap and at least two tie down rings proximate the perimeter of the cargo area, positioned approximately opposite each other. In trucks and trailers, additional tie down rings may be conveniently placed near the top of the vertical corners of the cargo bed. At least one of each pair of the tie down rings is configured to allow a cargo restraining strap to be passed through it and be attached to a mechanical tightener, e.g., a ratchet, which is located conveniently on a wall of the cargo area, at a distance from the pass-through, tie down ring. The mechanical tightener may be rotatably and removably attached to the wall of the cargo area. The cargo restraining strap, both of the tie down rings and the mechanical tightener, and their respective anchoring sites, must all be strong enough to restrain cargo under predetermined conditions of cargo weight, vehicle speed and type of accident.

11 Claims, 4 Drawing Sheets

CARGO RESTRAINT SYSTEM

Second Continuation-in-Part Application of Parent application Ser. No. 10/392,451, filed Mar. 20, 2003, abandoned First Continuation-in-Part application Ser. No. 10/830,692, filed Apr. 21, 2004, abandoned.

FIELD OF THE INVENTION

This invention relates to a cargo restraint system which can be used to safely secure a wide variety of loads in a vehicle cargo area.

BACKGROUND OF THE INVENTION

Vehicles, including trailers, trucks, SUV's, vans, minivans, station wagons, and the like, all have a cargo area, but, remarkably, all lack a safe and adequate means to restrain and secure objects, especially during an accident or emergency maneuver. Pickup trucks' cargo tie down points are not strong enough and are placed incorrectly for most cargo, and most SUV's, vans, minivans, and station wagons have absolutely no means to secure cargo. There are some after market accessories which purport to aid in securing cargo from moving during transport, but even these universally have no actual means to firmly secure the cargo during an accident or emergency maneuver.

The National Highway Traffic Safety Administration notes that in 2001, in the United States, 36,000 people died in traffic accidents and 2.9 million were injured. Many thousands of these were undoubtedly injured or killed by unsecured cargo. In a 58 kmph (35 mph) head-on crash, a 454 g (one pound) can of food in the back seat continues forward at 15.2 meters-per-second (50 feet-per-second) until it strikes something or someone with a potential of up to 445 newtons (100 pounds) of force. Even if passengers are unharmed during a panic maneuver or accident, unsecured cargo may well result in damage to the cargo and damage to the vehicle.

Even pickup trucks have inadequate means to safely secure loads within the truck bed. Most truck manufacturers provide tie down rings or rope cleats within their truck beds, but these are universally placed proximate the four corners of the bed and are usually placed high up on the corner, at or near the top of the sides of the bed. After market tie down accessories universally attach proximate the top of the sides of the truck bed, and are frequently designed to attach to the "stake holes" which are located in the corners. The placement of these tie down points poses several problems: if the truck owner has an object to transport which is shorter than the height of the tie down rings, then the rings cannot be used to secure the object, e.g., if the owner wants to transport twelve 2×4's, stacked four wide and three deep, then the top of the stack is only 11 cm (4.5") above the bed. If the tie down rings are 40 cm (16") above the bed, they are useless. Second, by placing the rings in the bed corners, cargo in the center of the bed cannot be adequately secured. The inability to adequately secure cargo can lead to the cargo shifting during transit, sometimes damaging the cargo and/or damaging the truck bed. During emergency maneuvers or an accident, inadequately secured cargo can be thrown through the truck rear window, injuring or killing the occupants, or the cargo may be thrown completely out of the truck, posing a hazard to other drivers and pedestrians.

Further, both the after market tie down devices and the tie down rings/cleats provided by all truck manufacturers are just not strong enough to truly restrain heavy cargo in an accident. Pickup trucks are typically listed as being able to carry 455 kg (½ ton), 682 kg (¾ ton) or 910 kg (one ton), but their tie down rings are typically made out of 0.635 cm (¼") steel rod, and the rings are universally anchored to the sheet metal of the bed wall. Even 227 kg (¼ ton or 500 lbs) anchored to these rings in an 83 kmph (50 mph) head-on crash would simply tear these tie down rings out of the sheet metal.

Having studied this situation, it is truly amazing that vehicle owners, vehicle manufacturers, accessory manufacturers and the law have allowed this dangerous condition to continue unabated, and with no real solution. The subject of the current invention provides the first true solution to safely and conveniently secure cargo within a vehicle's cargo area.

BACKGROUND

Description of Prior Art

As mentioned above, there simply are no cargo tie down means for SUV's, vans, minivans, station wagons and the like. However, in 2002, two of the new "cross over" vehicles, the Aztek by Pontiac and its cousin, the Matrix by Toyota, came out with multiple cargo tie down rings attached to the walls of the cargo area and two "C" rails embedded in the floor of the cargo area to which cargo tie down rings can be attached. This is certainly a step in the right direction, but both the tie down rings in the cargo area walls and the "C" rails are not strong enough to restrain even moderately heavy cargo during a crash.

The rest of this section will be devoted to prior art in relation to trucks, and especially pickup trucks. A number of devices are patented, and still more are on the market which purport to be tie down devices. Typical of these are Wheatley, U.S. Pat. No. 6,256,844 and Tekavec, U.S. Pat. No. 6,350,089—both show devices which attach near the top of the side wall of a pickup truck bed. As already noted, tie down points at this height are useless for restraining items which are shorter than the height of the tie down points. Also, both attach only to the sheet metal at the top of the bed side walls which is not strong enough to restrain heavy cargo in an accident.

Davis, U.S. Pat. No. 5,445,482 partially solves the problem of restraining short cargo with, "A cargo tie down permanently installable to the bed or floor of the cargo area . . . provides security for relatively thin, flat or narrow articles" (first sentence of his patent Abstract). While solving the problem of securing cargo which is shorter than the height of the truck side walls, he creates another problem: affixing and tightening a rope or other cargo restraining means to his device. Since his device sits on the cargo floor, close to the bed side wall, it is inconvenient to attach and tighten a cargo restraining means (a rope or strap) to it. Standing along side the truck, the height of the side walls—usually 40 to 50 cm (16 to 20 inches) above the bed floor—interferes with such an attachment and tightening. If the operator climbs into the truck bed to attach and tighten the tie down means, s/he must compete with the cargo for space—the larger the cargo, the worse this problem becomes.

Truck manufacturers, as noted above, if they provide tie down points at all, universally place the tie down points only in or near the four corners of the truck bed. Most of these tie down points are near the upper edge of the truck bed, however a few manufacturers have started to place the tie down points close to the bed, and only the Cadillac Escalade EXT and its cousin, the Chevrolet Avalanche, have tie down points at both the bed level and near the top of the side wall of the bed in all four corners. Because of their location, only in the four corners, these tie down points suffer from the same deficiencies as noted above.

In 2004, Nissan introduced their new Titan pickup truck with an optional Utili-track bed channel system for securing cargo. Again, this is certainly a step in the right direction, but Nissan's design has several hidden flaws:

1. Both the two bed channels and the three channels attached to the inside upper edges of the bed walls are made of "C" shaped aluminum alloy which is not strong enough to safely restrain heavy objects during a crash. Further, all of these channels are secured to the bed and side walls by only a few bolts—in a head-on accident, either the channels or these bolts would fail allowing the cargo to be thrown into the back of the passenger cab.

2. The bed channels are too close together to be usable for restraining standard 4×8 sheet material—even their own promotional photo at the Nissanusa.com web site clearly shows unrestrained plywood sheets in the Titan's bed.

Hetchler, U.S. Pat. No. 5,338,136, designed a cargo restraint apparatus which solved the problem of restraining cargo which is shorter than the usual height of tie down rings in most pickup trucks, but his design has several flaws:

First, Hetchler's winch is not easily removable. Hetchler does not teach his winch as being removable, and his patent states, " . . . a conventional winch 44 with pawl and ratchet secured to upper end 34 of support member 32 by the nut 38, bolt 40 . . . and lock washer 42 or other suitable means such as welds, a pulley assembly 46 secured to lower end 36 of support member 32 by any conventional means such as welds 47 . . . " column 3, lines 9 through 16. Since welding is a suitable means of connecting both the winch 44 and the pulley assembly 46 to support member 32, it is obvious that Hetchler meant for these items to be a single unit, 30, which he calls a "cargo restraining apparatus". Hetchler teaches that this unit should be attached to the truck by at least three nuts, bolts and lock washers. The specific inclusion of the lock washers indicates that Hetchler intended for his "cargo restraining apparatus" to be installed and left in place for long periods of time. It is conceivable that this unit could be removed, but since nut 54 can only be accessed from underneath the truck, removal certainly could not be considered easy or convenient. Thus, Hetchler's winch would be exposed to the elements which might corrode it, and to sand and dirt, which are common loads for pickup trucks, which might clog it. In addition, certain large loads, e.g., firewood, might impinge on the winch and damage it. The current design solves these problems by eliminating Hetchler's support member 32, thus allowing the third tie down means to be made easily removable via a docking assembly. In the current invention, the third tie down means has a docking mechanism attached to it, and there are one or more conveniently located docking ports on a wall of the cargo area. The third tie down means docking mechanism can be easily engaged to or disengaged from any of the docking ports.

Second, because Hetchler specifically designed his cargo restraining apparatus 30 as a single, rigid unit, his design can only be used to restrain cargo horizontally against the bed of a truck. By eliminating Hetchler's rigid support member 32, the current invention's third tie down means can be rotated about its docking mechanism axis, in a plane parallel to the cargo area wall on which the docking port(s) is located, to allow cargo to be restrained vertically against either the front wall or the closed tailgate of the truck bed.

Third, Hetchler designed his invention specifically as an after market accessory for an open bed pickup truck. He did not anticipate his invention being incorporated into enclosed cargo areas, such as SUVs and vans. Hetchler's cargo restraining apparatus has a rigid support member, 32, which holds his winch 44 and pulley assembly 46 in rigid relationship to each other in a vertical plane which includes all three items. Thus, the winch can only be placed immediately above the pulley assembly with no possibility of rotating it about its attachment point or placing it in a more convenient or distant location. Hetchler's design could not be integrated into the design of SUVs, vans, mini-vans, station wagons, or the like because the location of the winch would make it clumsy and awkward to operate in an enclosed cargo space, even in pickups with a shell top over the bed. Also, his cargo restraining apparatus, 30, would be in the way of, and pose a safety hazard to passengers. By eliminating Hetchler's rigid support member 32, the current invention's third tie down means can be placed in a variety of locations, out of the vertical plane which includes the first two tie down points, and away from the vehicle occupants, thus allowing the current invention to be designed into the cargo spaces of SUVs, vans and the like.

Fourth, Hetchler does not mention safety or the need to restrain heavy cargo in the event of an accident. He shows only one of his devices in his figures and does not mention the possibility of having more than one device on the vehicle, even though two devices would greatly increase the ability to safely restrain cargo. His emphasis is on restraining long cargo in "an effective, efficient and economical manner" (Column 2, Lines 27-28), not on safety. In fact, he does not even use the word "safety" in his patent. Careful reading of Hetchler's patent sheds little light on either his intention or his design principals, except for the statement in column 3 lines 28-34: "The rigid support member 32 . . . also serves as a spacer between the winch 44 and pulley assembly 46 to prevent a heavy load from exerting undue pressure upon the pulley assembly 46 and possibly causing it to separate from the truck floor." He does not mention the conditions under which this separation might occur, e.g., an accident or an emergency maneuver, he does not mention possible damage to the cargo or the truck, and he does not mention safety issues for the occupants of the truck or bystanders/other drivers. In short, Hetchler does not address safety issues related to carrying cargo in a pickup truck during an accident.

Hetchler specifically designed his invention for the after market. He notes, column 2, lines 37 and 38, that one of his specific objects is to provide a restraint apparatus "which is easy to install", which further delineates that his invention is to be attached to the truck as an after market accessory. As such, even if Hetchler had wanted to, it would have been impossible for him to have included design criteria regarding restraining cargo under predetermined conditions of cargo weight, vehicle speed and type of accident.

Hetchler recites in several places in his patent, including in claims 3, 4, 7 and 8, that his preferred method of anchoring his invention to the sheet metal of the truck bed, is with bolts, nuts and lock washers, and he shows this clearly in FIGS. 2 and 3. This preferred method of attaching his invention has obvious strength limitations and Hetchler makes no provision to strengthen his attachment points. While making some provision to strengthen the mounting of his pulley assembly, Hetchler makes no special provision for preventing the separation of his strap anchor assembly 60 from the other side of the bed floor. Thus, he has created a weak link which would likely fail in the event of a serious accident. Hetchler could have specified anchoring both his cargo restraining apparatus 30 and his strap anchor assembly 60 to the subframe, but he didn't. There is nothing in the way that Hetchler attaches his invention to a truck that indicates he anticipated designing or installing it to withstand the forces generated in a serious accident. The current invention addresses a cargo restraint system designed by engineers to be built into the vehicle at the time of manufacture to meet predetermined criteria for safety during an accident. Hetchler did not anticipate an original equipment version of his invention, and he makes no effort to design or teach the need for the entire system, including the anchoring of it, to be strong enough to restrain cargo under predetermined conditions.

SUMMARY

In accordance with the present invention a vehicle cargo restraint system comprises a cargo restraining means, two tie down means located proximate the perimeter of the vehicle's cargo area floor, placed approximately opposite each other, and a third tie down means conveniently located at a distance from both of the first two tie down means. The tie down means closest to the third tie down means must be capable of allowing one end of the cargo restraining means to be passed through it. The cargo restraining means, all three of the tie down means and their respective anchoring means, must all be strong enough to restrain cargo under predetermined conditions of cargo weight, vehicle speed and type of accident. The third tie down means is fitted with a docking mechanism which may be easily engaged to or disengaged from any of several conveniently located docking ports. Thus, the third tie down means may be removed from the cargo area and stored away from the weather and dirt. The third tie down means may also be rotated about the docking mechanism axis in a plane parallel to the cargo area wall on which the docking port(s) is located to allow cargo to be restrained vertically as well as horizontally.

OBJECTS AND ADVANTAGES

The general object of the current invention is to provide a versatile, convenient, economical and easy to use vehicle cargo restraint system which greatly improves safety.

A specific object of the invention is to provide a cargo restraint system which is versatile enough to be installed in trucks, SUV's, vans, minivans, station wagons, trailers and other cargo carrying vehicles.

A specific object of the invention is to provide a means to secure items either to the floor or to a side wall, or to both, of a cargo area, depending on the nature of the cargo and how it can best be secured.

A specific object of the invention is to provide a means to secure items which are shorter than the height of the side wall of a vehicle cargo area.

Another specific object of the invention is to provide a means to secure cargo which is not capable of being adequately secured by tie down points located only in the four corners of a vehicle cargo area.

Another specific object of the invention is to locate the third tie down means in a convenient place, at a distance from both of the first and second tie down means.

Another specific object of the invention is to attach the third tie down means to a tie down anchor site by means of a docking assembly comprised of a docking mechanism attached to the third tie down means which may be easily engaged to or disengaged from any of several conveniently located docking ports.

Another specific object of the invention is to provide a means whereby the third tie down means may be removed from the cargo area to be stored away from the weather which might corrode it and away from dirt and sand which might clog the mechanism.

Another specific object of the invention is to provide a means whereby the third tie down means may be rotated about the axis of the docking mechanism in a plane parallel to the wall on which the docking port is located.

Another specific object of the invention is to secure cargo during an accident under predetermined conditions of cargo weight, vehicle speed and type of accident.

Another specific object of the invention is to provide a means to keep the mechanical tightener means physically separated from the cargo to prevent damage which would be caused by the mechanical tightener rubbing against the cargo.

Further objects and advantages of the current invention will become apparent from a consideration of the drawings and ensuing descriptions.

BRIEF DESCRIPTION OF THE DRAWINGS

FIG. 3 is a partially cut-away isometric view of a schematic cargo area of an enclosed trailer, enclosed truck, SUV, van, minivan, station wagon or the like.

DESCRIPTION

Figure 1:
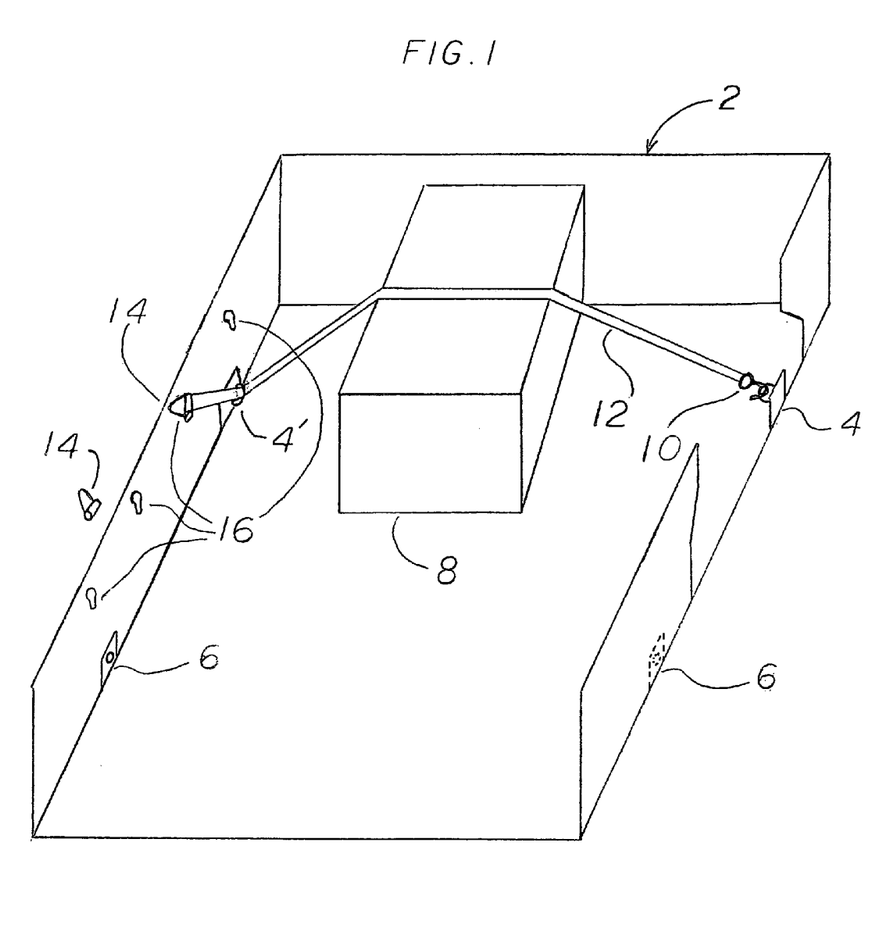
FIG. 1 is a partially cut-away isometric view of a schematic cargo area of an open trailer or pickup truck bed with cargo secured against the floor.

FIG. 1: Preferred Embodiment

FIG. 1, Item 2 is a partially cut-away isometric view of a schematic cargo area of an open trailer or a pickup truck bed, or the like, with cargo, Item 8, secured according to the teaching of the current invention. Items 4, 4', 6 and 6' are pairs of first and second tie down means secured to the inner walls of the truck bed, proximate the perimeter of the cargo area floor. These pairs of tie down means could also be attached to the cargo area floor. While any type of tie down means could be used, Items 4, 4', 6 and 6' represent recessed rings which do not intrude into the cargo area when not in use. The number and placement of these tie down means around the perimeter of the cargo area shall be determined by the size and configuration of the area, and the configuration of the expected cargo, however the use of two locations which divide the cargo area into approximate thirds should be adequate for most applications. For example, see the location of tie down points 4 and 4' in relation to tie down points 6 and 6'.

Item 8, the cargo, is secured by strap 12 which releasably attaches to a first tie down means 4 by any suitable, releasable connector 10, in this case, a hook. Strap 12 engages the cargo to hold it securely in place. Strap 12 passes through the second, pass-through, tie down means 4' and attaches to a third tie down means 14 which may be rotatably and removably connected to the side wall of the cargo bed at any of the multiple, conveniently located tie down docking ports 16. While any type of tightener could be used, Items 14 and 14' represent ratchets. While any type of tie down anchor site could be used, Items 16 represent key holes or docking ports into which a protrusion or docking mechanism (shown as Items 28 and 30 in FIG. 5) of item 14 may be inserted. Items 4, 4' 6, 6', 10, 12, 14, 14', 16 and 16', are all designed to be strong enough to restrain heavy cargo under predetermined conditions of cargo weight, vehicle speed, and type of accident. In addition, Items 4, 4', 6, 6', 14 and 14' are all designed to be affixed to the vehicle in such a manner as to be strong enough to restrain heavy cargo under predetermined conditions of cargo weight, vehicle speed, and type of accident. To achieve the strength required, certain structural modifications may be needed to the design of the vehicle.

Figure 2:
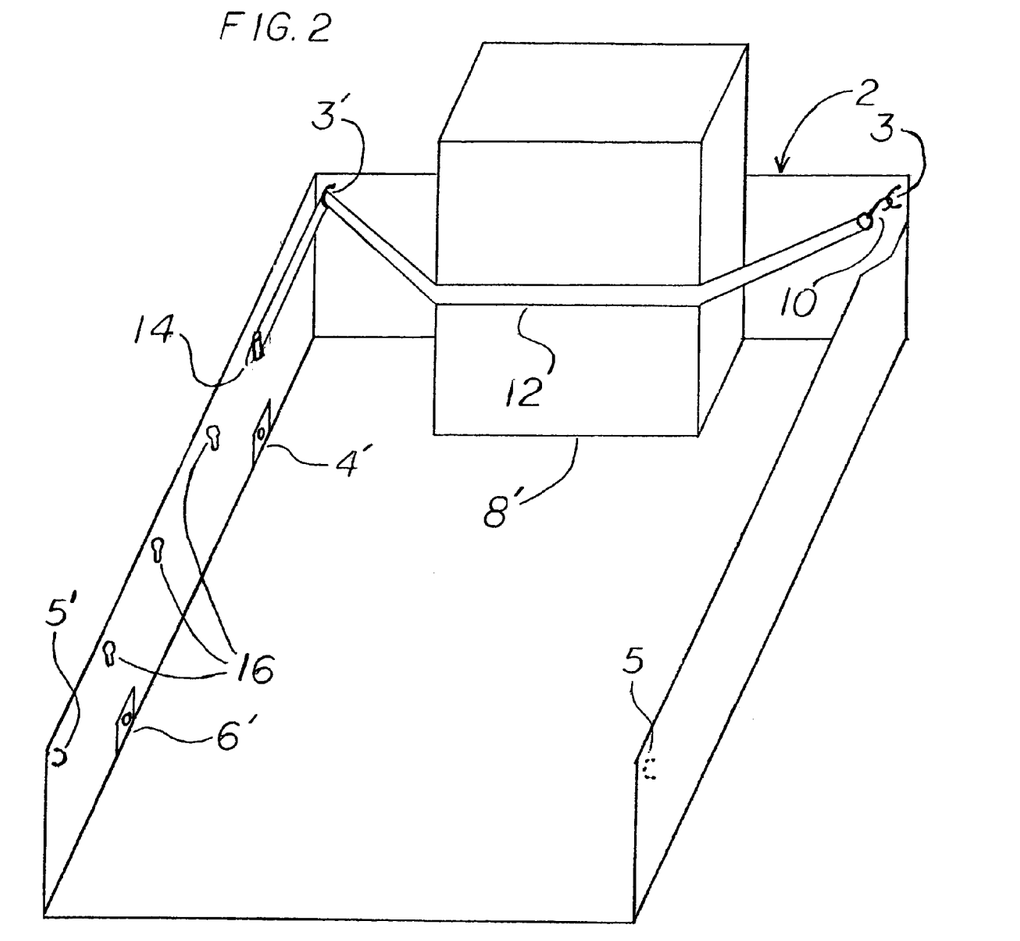
FIG. 2 is a partially cut-away isometric view of a schematic cargo area of an open trailer or pickup truck bed with cargo secured against a side wall.

FIG. 2: Variation of Preferred Embodiment

FIG. 2 is similar to FIG. 1, however the cargo 8' is now restrained against the front of the truck bed. The cargo restraint means 12 is attached between first and second tie down means 3 and 3' high up on the wall of the truck, proximate the vertical corners of the cargo bed, similar to current manufacturing practice. The third tie down means is rotated ninety degrees from its position in FIG. 1 so that it can receive the end of the cargo restraint means 12. Alternately, the third tie down means could be rotated ninety degrees in the opposite direction, attached to a conveniently located docking port 16 and, utilizing tie down points 5 and 5', cargo could be restrained against the inside of the tailgate (not shown).

Figure 3:
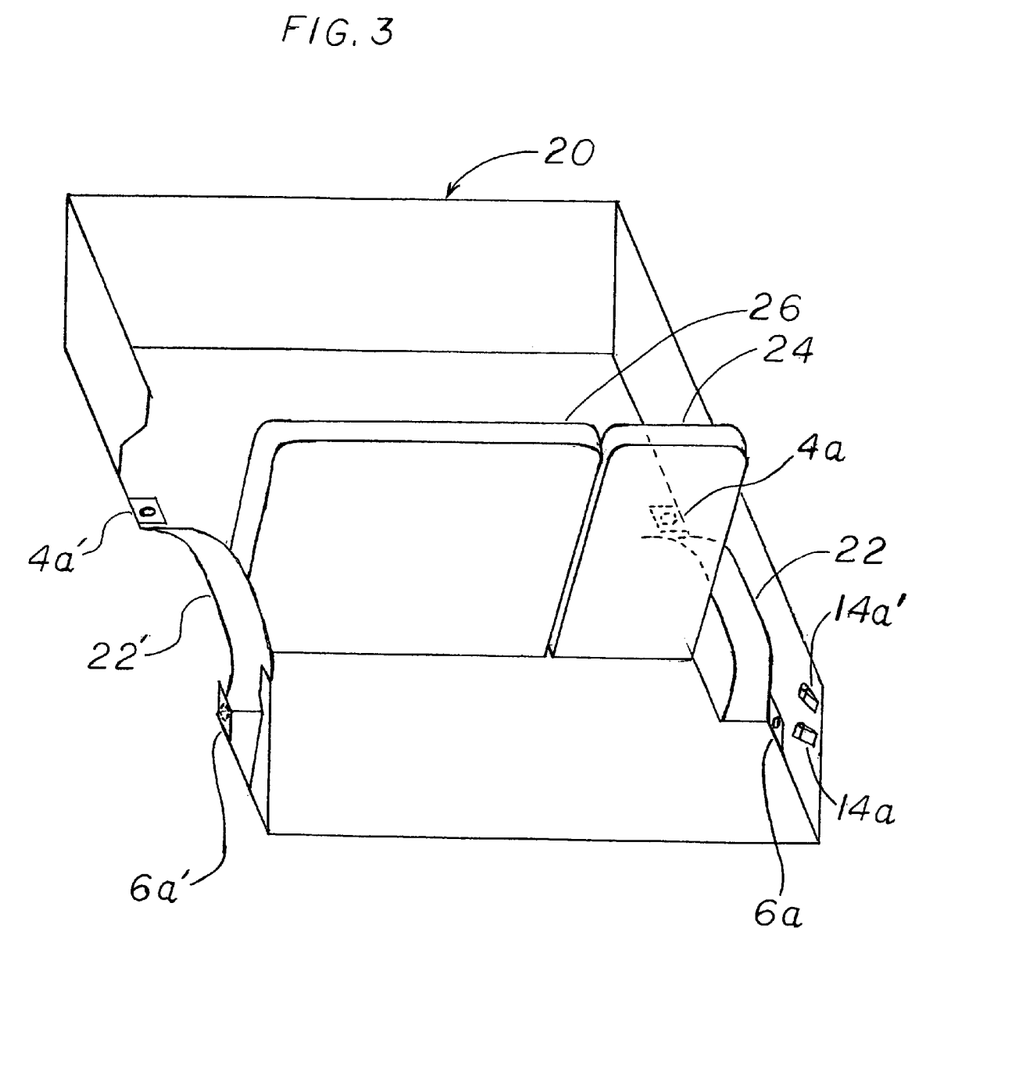

FIG. 3: Add/Tonal Embodiment

FIG. 3, Item 20 is a partially cut-away isometric view of a schematic cargo area of an enclosed trailer, enclosed truck bed, an SUV, van, minivan, station wagon or the like which has an enclosed cargo area accessible by a rear tailgate, hatch or door(s). For clarity, only the bottom portion of the enclosed cargo area is shown. Items 22 and 22' are the fender wells. Items 24 and 26 are the backs of the rear seats of the vehicle—of course, these would be absent in a trailer or truck. Items 6a and 6a' are a pair of tie down means which are attached to the walls of the cargo area, proximate the perimeter of the cargo area floor. While any type of tie down means could be used, Items 6a and 6a' represent recessed rings which stay out of the way when not in use. Items 4a and 4a' represent additional tie down means attached to the floor of the cargo area proximate the perimeter of the cargo area floor. Items 4a and 4a' also represent recessed rings which lay flat on the floor when not in use. Floor mounted tie down means of this sort would be advantageous when the tie down point is located proximate a door of the vehicle. Items 14a and 14a' are mechanical tightening means, to secure a rope, strap or other cargo restraining means, not shown. These mechanical tightening means are placed conveniently proximate the rear of the vehicle, away from the tie down rings. Unlike Hetchler's design, these mechanical tightening means are specifically placed out of a vertical plane which includes the first and second tie down means. Since they would be out of the weather, they may be either solidly affixed, rotatably affixed and/or removably affixed to the wall of the cargo area. Alternately, they could be hidden behind removable or openable covers so as to not be seen when not in use. Item 14a would serve as the mechanical tightening means for a cargo restraining means (not shown) attached to tie down means 6a and 6a'. Item 14a' would serve as the mechanical tightening means for a cargo restraining means (not shown) attached to tie down means 4a and 4a'. The tie down means (not shown) and items 4a, 4a', 6a, 6a', 14a and 14a' are all designed to be strong enough to restrain heavy cargo under predetermined conditions of cargo weight, vehicle speed, and type of accident. In addition, Items 4, 4', 6, 6', 14a and 14a' are all affixed to the vehicle in such a manner as to be strong enough to restrain heavy cargo under predetermined conditions of cargo weight, vehicle speed, and type of accident. To achieve the strength required, certain structural modifications may be needed to the design of the vehicle. While this alternate embodiment is depicted in a vehicle cargo area, it would be equally applicable to a trailer, especially an enclosed trailer, or the like, or to an enclosed truck, such as a pickup with a canopy.

Figure 4:
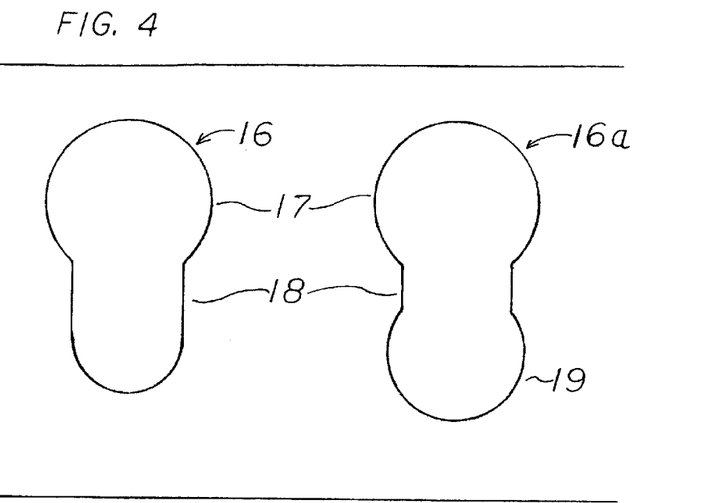
FIG. 4 is a plan view of two variations of a docking port, tie down anchor sites, 16 and 16*a*, to which a third tie down means 14 with a docking mechanism can be rotatably and removably connected.
Figure 5:
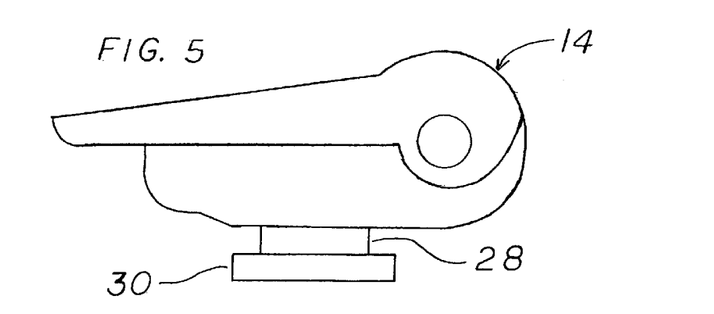
FIG. 5 is a side plan view of a third tie down means 14 fitted with a docking mechanism, 28 and 30, which allows it to be rotatably and removably connected to any of the docking ports 16 or 16*a*.

FIGS. 4 & 5: Docking ports and a third tie down means with a Docking Mechanism to Attach to Either of the Docking Ports FIG. 4 shows two variations of docking ports, 16 and 16a. The diameter of the upper opening 17 is slightly larger than round button, Item 30 of third tie down means 14 so that Item 30 can be inserted through opening 17. The neck of both keyholes 18 is slightly larger than the diameter of the round stalk 28 of third tie down means 14 so that the stalk can be slid down neck 18 to entrap Item 30 behind the neck. Item 16 is a standard keyhole, but Item 16a has a circular opening 19 at it's bottom which is smaller than button 30 and larger than the neck 18. This reduces the possibility of stalk 28 working its way out of neck 18 due to vibration, when the third tie down means 14 is oriented horizontally as shown in FIG. 2.

Operation: FIG. 1

In the preferred embodiment, one end of a tie down strap, or other cargo restraining means 12 can be connected to the first tie down means 4 by releasable connector 10, in this case a hook, and placed over the cargo 8. The other end of the cargo restraining means would then be passed through the second, pass through, tie down means 4' on the opposite side of the cargo area and attached to the third tie down means 14. The third tie down means 14 can be attached to any of the conveniently located docking ports 16, depending on the dimensions of the cargo to be restrained. When the third tie down means 14 is tightened, the cargo is forced down onto the floor, thereby increasing friction between the cargo and the floor and safely restraining the cargo. The tighter the tie down strap, the greater the friction and the greater the safety in case of an emergency maneuver or accident. Therefore, it is important that the third tie down means be a mechanical tightener which can be used to exert considerable tightening force on the cargo restraining means.

In addition to being able to tightly restrain the cargo, the position of the tie down means proximate the perimeter of the cargo area floor and in locations other than just in the four corners of the cargo area is crucial to being able to restrain both large and small cargo. The current practice of placing tie down rings only in the four corners, and usually near the upper edge of the cargo area side walls greatly limits the ability to adequately restrain a wide variety of cargos. Thus, the current invention allows for much greater safety than current practice; it is also much more flexible in the number and types of cargo it can safely restrain.

In practice, being able to attach the third tie down means 14, also known as a mechanical tightener, to any one of multiple docking ports 16 located on the side wall of the cargo area, is much more convenient for the user, both to tighten and to loosen, than a conventional tie down strap where the ratchet is an integral part of the strap and located near one end of the strap. In some cases of large or tall cargo, the cargo or the strap may interfere with the operation of the third tie down means. In this case, simply moving the third tie down means 14 to another docking port solves the problem. This solution is not possible with a permanently attached winch. The use of a simple tie down ring for the second, pass-through tie down means allows the strap to be angled to attach to the third tie down means wherever it is most convenient. This is not possible when a rigidly attached pulley is used as the second, pass-through tie down means. Of course, the mechanical tightener can be stowed within the truck cab when not in use to protect it from the elements and from messy loads such as sand or dirt. Attaching the mechanical tightener to the side of the cargo area wall also keeps it away from the cargo so it cannot rub against the cargo and possibly damage it in transit. In practice, the mechanical tightener would be mounted on the left side of the truck bed where the driver could conveniently tighten or loosen it.

Operation: FIG. 2

Many pickup trucks have tie down points similar to Items 3, 3', 5 and 5'. By turning the mechanical tightener horizontally, it can be used to tighten cargo 8' against the front of the cargo bed, as shown in FIG. 2. Likewise, by turning it in the opposite direction, and connecting it to any of the conveniently located docking ports 16, it could be used to tighten cargo against the inside of the tailgate. This is an additional benefit not available in designs which use a rigidly attached mechanical tightener.

Operation: FIG. 3

An alternate embodiment of the current invention (see FIG. 3), is more applicable to enclosed trailers, enclosed trucks, SUVs, vans, minivans, station wagons, and the like. The primary first and second tie down means, 6a and 6a', would usually be located out of the way, behind their respective wheel wells, as shown. Cargo (not shown) would be placed behind the last row of seats, Items 24 and 26, and restrained by a cargo restraining means, e.g., a rope or strap, in the same manner as described above for FIG. 1. One end of the cargo restraining means would be attached to the first tie down means, Item 6a', placed over the cargo, passed through the second tie down means 6a and attached to the mechanical tightener, Item 14a. In this case, the mechanical tightener, e.g., a ratchet, is conveniently placed on the side wall of the cargo area, near the rear corner of the cargo area. It can be rotatably mounted or placed at an angle so it can receive the cargo restraining means in a direct line from the second, pass through, tie down means 6a.

The secondary, first and second tie down means, Items 4a' and 4a, would be used primarily when the seats, Items 24 and 26, are either removed or folded flat, and when large or long cargo needed to be restrained. These tie down means may be placed on the floor, as shown. This configuration would be convenient if there were doors next to the tie down means. In practice, a cargo restraining means would be attached to the first tie down means, Item 4a', passed over the cargo (not shown), through the second, pass through tie down means 4a, and back to the second mechanical tightener, Item 14a'.

Since this embodiment is designed to be used in a weather protected, enclosed space in which it is unlikely the owner would transport messy loads such as dirt or sand, there is no need to make the third tie down means removable, however it could be made removable and/or rotatable. The vehicle manufacturer might want to conceal the third tie down means behind a removable panel or openable door when they are not in use.

Thus, the design of the current invention, with only minor variations, is flexible enough to provide safe cargo restraint in a wide variety of vehicles, including: pickup trucks and enclosed trucks, open and enclosed trailers, SUVs, vans, minivans, station wagons and the like. The design shown in FIGS. 1 & 2 lends itself equally well to both after market products and to original equipment manufacturers, while the FIG. 3 design is appropriate primarily as original equipment. Of course, an after market version could not be designed to restrain heavy cargo under specified conditions, but it could be designed to attach the first and second tie down means to a subframe member, and the docking port(s) could be designed to provide added rigidity to the side wall of the truck bed.

CONCLUSION, RAMIFICATIONS, AND SCOPE

After examining this Patent Application it will be clear that providing strong cargo tie down points proximate the perimeter of the cargo area floor in conjunction with a strong, mechanical tightener conveniently located at a distance from one of the tie down points, has important practical, safety and convenience advantages over the current practice of less than adequately strong tie down points located only in the corners and without a convenient tightening means. Further, it will be clear that the current invention in which the third tie down means is located according to convenience would be much easier to use and more flexible than a design in which the mechanical tightening means is rigidly attached at a location dependent on the design of the restraint system.

Eliminating Hetchier's rigid support member 32, produces the unexpected, novel, useful and unobvious results of:

1. Allowing the third tie down means to be mounted in any one of several convenient locations.

2. Allowing the third tie down means to be easily removably mounted via a docking assembly.

3. Allowing the third tie down means to be rotatably mounted to secure cargo vertically as well as horizontally.

4. Allows the current invention to be used in enclosed cargo areas, such as in SUVs and vans, in addition to be used in open cargo areas.

These are substantial and significant differences from the design and use of Hetchler's invention.

Further, it will be clear that the current invention would be considered unobvious by a person of ordinary skill in the art of vehicle cargo restraint system design because:

1. Providing strong cargo tie down points proximate the perimeter of the cargo area floor in conjunction with a mechanical tightening means which is easily removed and conveniently located at a distance from one of the tie down points, is neither appreciated, nor anticipated, nor suggested nor implied in any prior art or combination of prior art in the field of vehicle cargo restrain systems.

2. It solves the long felt, but unsolved need for a means to adequately secure heavy cargo in vehicles including trailers, trucks, SUVs, vans, minivans, station wagons, and the like, during emergency maneuvers or an accident. All current designs for these types of vehicles are inadequate to restrain heavy cargo during an accident.

3. It solves the unappreciated problem of the need for a cargo restraint system design flexible enough to be used in open and closed trucks, open and closed trailers, SUVs, vans, minivans, and the like.

4. It solves the unrecognized problem of the need for a single cargo restraint system to adequately secure cargo either to the floor or to a side wall of a cargo area of a vehicle.

5. It solves the problem for a means to safely secure cargo which cannot adequately be secured by tie down points in just the four corners of a vehicle's cargo area. This problem, no less the solution, has not previously been appreciated by other inventors. Hetchler does not mention this problem, only the need to restrain long objects.

6. It solves the need to locate a mechanical tightener, e.g., a ratchet, in a convenient place. This is a problem which has never before been appreciated since all current designs for cargo tie down straps place the buckle or ratchet at a fixed distance from one end of the strap, thereby precluding the possibility of locating the mechanical tightener in an alternate position. Likewise, Hetchler allows only one position for his winch, which may not be convenient for some cargos. Convenient location has not been an option until now.

7. It solves the problem of locating a mechanical tightener at a distance so that it is physically separated from the cargo to prevent damage which might otherwise be caused if the mechanical tightener were to rub against the cargo. Again, this is a problem which has never before been solved as part of the design of a tie down system—Hetchler did not appreciate it as a problem. Previous attempts to solve this problem involve placing a barrier, e.g., a folded cloth, between the mechanical tightener and the cargo. If the barrier were to fall out or otherwise move during transit, the tightener could possibly rub against the cargo. The current solution is superior because it physically separates the tightener from the cargo.

8. Lastly, it is clear that the current invention would be considered unobvious by a person of ordinary skill in the art of vehicle cargo restraint system design since thousands of professional engineers (people of at least ordinary skill) employed full-time by every auto manufacturer in the world to design trucks, SUV's, vans, minivans, station wagons and the like, have not implemented a system to adequately secure heavy cargo in the vehicles they design.

Although the description above contains many specifics, these should not be construed as limiting the scope of the invention, but merely as providing illustrations of some of the presently preferred embodiments of this invention. For example, the mechanical tightening means 14 could be built into an indentation in the top of the cargo area side wall to move it out of the cargo area completely. Or, in an aftermarket version, the winch could be incorporated into a bed rail, a decorative and functional rail added on top of the side walls of a pickup truck. Many different types of tie down means, cargo restraining means and mechanical tighteners can be used without departing from the teachings of the current invention.

Thus the scope of the invention should be determined by the appended claims and their legal equivalents, rather than by the examples given.

The embodiments of the invention in which an exclusive property or privilege is claimed are defined as follows:

1. For a vehicle having a cargo area, said cargo area having:
   at least one wall, said wall having at least one conveniently located, tie down docking port; said docking port having an aperture configured to be engaged to a protruding, complementary docking mechanism to secure said docking mechanism to said docking port without the need of a nut(s) or a bolt(s), and a floor, said floor having a perimeter, a cargo restraint system comprising:
   a cargo restraining means having a first end, an intermediate portion for engaging cargo, and a second end;
   at least one first tie down means disposed proximate said perimeter of said floor;
   at least one second, pass-through, tie down means disposed proximate said perimeter of said floor, approximately opposite said at least one first tie down means;
   and at least one third tie down means having a protruding, complementary docking mechanism configured to be inserted into said aperture to allow said docking mechanism to be easily and quickly engaged to and disengaged from said at least one conveniently located, tie down docking port,
   whereby cargo may be restrained against the floor of the cargo area by attaching said first end of said cargo restraining means to said at least one first tie down means, engaging cargo with said intermediate portion of said cargo restraining means,
   threading said second end of said cargo restraining means through said at least one second, pass-through, tie down means, and securing said second end of said cargo restraining means to said at least one third tie down means which has been engaged to said at least one conveniently located, tie down docking port.

2. The cargo restraint system of claim 1 wherein said at least one third tie down means, when engaged to said at least one conveniently located, tie down docking port, is capable of being rotated in a plane parallel to said wall of said cargo area.

3. The cargo restraint system of claim 1 wherein said at least one third tie down means is a mechanical tightening means.

4. The cargo restraint system of claim 1 wherein said cargo restraining means and said at least one first, second and third tie down means are designed to be strong enough to restrain heavy cargo under predetermined conditions of cargo weight, vehicle speed and type of accident.

5. The cargo restraint system of claim 1 wherein said at least one first, second and third tie down means are affixed to the vehicle in such a manner as to be strong enough to restrain heavy cargo under predetermined conditions of cargo weight, vehicle speed and type of accident.

6. For a vehicle having a cargo area, said cargo area having a floor and at least three walls including a first wall, a second wall and a third wall; said second wall having a width; said third wall having at least one conveniently located, tie down docking port; said first wall and said third wall being approximately opposite and parallel to each other; said first wall and said third wall being separated by the width of said second wall such that said first wall and said second wall converge at a first vertical corner, and said second wall and said third wall converge at a second vertical corner; said first vertical corner and said second vertical corner each having a top and a bottom; a cargo restraint system comprising:
   a cargo restraining means having a first end, an intermediate portion for engaging cargo and a second end;
   at least one first tie down means conveniently disposed proximate the top of said first vertical corner;
   at least one second, pass-through, tie down means conveniently disposed proximate the top of said second vertical corner approximately opposite said at least one first tie down means;
   and at least one third tie down means having a docking mechanism to allow it to be easily engaged to and disengaged from said at least one conveniently located, tie down docking port,
   whereby cargo may be restrained against said second wall by attaching said first end of said cargo restraining means to said at least one first tie down means, engaging cargo with said intermediate portion of said cargo restraining means, threading said second end of said cargo restraining means through said at least one second, pass-through, tie down means, and securing said second end of said cargo restraining means to said at least one third tie down means which has been connected to said at least one conveniently located, tie down docking port.

7. The cargo restraint system of claim 6 wherein said at least one third tie down means, when engaged to said at least one conveniently located, tie down docking port, is capable of being rotated in a plane parallel to said third wall of said cargo area.

8. The cargo restraint system of claim 6 wherein said at least one third tie down means is a mechanical tightening means.

9. The cargo restraint system of claim 6 wherein said cargo restraining means and said at least one first, second and third tie down means are designed to be strong enough to restrain heavy cargo under predetermined conditions of cargo weight, vehicle speed and type of accident.

10. The cargo restraint system of claim 6 wherein said at least one first, second and third tie down means are affixed to the vehicle in such a manner as to be strong enough to restrain heavy cargo under predetermined conditions of cargo weight, vehicle speed and type of accident.

11. The cargo restraint system of claim 6 wherein said second wall may be a tailgate which may be opened to provide easy access to said cargo area.

* * * * *